United States Patent [19]
Jacknin et al.

[11] Patent Number: 5,854,843
[45] Date of Patent: Dec. 29, 1998

[54] VIRTUAL NAVIGATOR, AND INERTIAL ANGULAR MEASUREMENT SYSTEM

[75] Inventors: Lawrence Jacknin, Yellow Springs; Mark A. Ericson, Columbus, both of Ohio

[73] Assignee: The United States of America as represented by the Secretary of the Air Force, Washington, D.C.

[21] Appl. No.: 769,294

[22] Filed: Dec. 18, 1996

Related U.S. Application Data

[63] Continuation of Ser. No. 481,945, Jun. 7, 1995.

[51] Int. Cl.$^6$ .................................................. H04R 5/00
[52] U.S. Cl. .............................................. 381/25; 381/74
[58] Field of Search ...................... 381/25, 74; 73/493, 73/1 E, 1 D, 178 R, 510, 504.03, 504.04, 504.12, 504.14, 504.15, 504.16; 345/158; 364/453

[56] References Cited

U.S. PATENT DOCUMENTS

| | | | |
|---|---|---|---|
| 4,831,544 | 5/1989 | Hojo et al. | 73/504.03 |
| 5,270,959 | 12/1993 | Matsuzaki et al. | 73/1 E |
| 5,329,276 | 7/1994 | Hirabayashi | 345/157 |
| 5,440,817 | 8/1995 | Watson et al. | 73/1 E |
| 5,453,758 | 9/1995 | Sato | 345/158 |
| 5,495,534 | 2/1996 | Inanaga et al. | 381/74 |

OTHER PUBLICATIONS

Kenneth Meyer et al., "A Survey of Position Trackers," *Presence, The MA Institute of Tech.*, vol. 1, No. 2, Spring 1992, pp. 173 to 200.

"CyroChip", Systron Donner Inertial Division, A BEI Electronics Co. Concord, CA, B:Theory. OP\gyr\070192, pp. 1–5.

Lucas Sensing Systems, "Angle Measurement, Dual Axis Clinometer Provides X–Y Leveling/Motion Detection", p. 1 (undated).

"Model 544 Miniature Angular Orientation Sensor, Roll, Pitch and Yaw Sensors in a single Miniature Package, " Applied Physics Systems, Mountain View CA pp. 1–4.

D. Aley & M. Donahue, Ibi–Sendai Corp, "Sourceless Orientation Sensor", *Sensors* Nov. 1993, p. 55.

*Primary Examiner*—Curtis A. Kuntz
*Assistant Examiner*—Ping W. Lee
*Attorney, Agent, or Firm*—Gina S. Tollefson; Gerald B. Hollins; Thomas L. Kundert

[57] ABSTRACT

A position tracker uses an inertial angular measurement system, for measuring orientation and linear translation of a helmet on a human head for the synthesis by a host computer of virtual, directional audio over headphones sensors mounted on the helmut, includes a roll gyro sensor, a pitch gyro sensor, a yaw gyro sensor, an absolute roll tilt sensor coupled to a first universal signal conditioner, an absolute pitch tilt sensor coupled to a second universal signal conditioner, and an absolute yaw compensator. A data acquisition system is coupled between the sensors and the host computer for converting analog signals from the sensors into digital, angular orientation data. Each of the gyro sensors includes angular velocity detectors and solid state electronic devices connected to provide angular velocity signals at a given sample rate.

6 Claims, 6 Drawing Sheets

VIRTUAL NAVIGATOR, AND INERTIAL ANGULAR MEASUREMENT SYSTEM

This application is a continuation of application Ser. No. 08/481,945, filed on Jun. 7, 1995.

The invention described herein may be manufactured and used by or for the Government of the United States for all governmental purposes without the payment of any royalty.

BACKGROUND OF THE INVENTION

The present invention relates generally to position trackers for virtual reality, using an inertial angular measurement system, called a Virtual Navigator.

Many position and orientation trackers have been developed over the past several decades with varying degrees of performance. To date, no individual technology has been clearly superior to the others, each having advantages and disadvantages in various applications. Position trackers can be categorized into four technological areas; mechanical, optical, magnetic, and acoustic. An excellent review of position trackers is discussed in Presence, Volume 1, Number 2, Spring 1992. A copy of the article is attached. Most position trackers also provide orientation information along with the position of the sensor.

Some orientation trackers only provide angular displacement. These technologies include magnetometers, inclinometers, and gyroscopes. Applied Physics Systems offers magnetometers for measuring orientation angles. Inclinometers are available from Lucas Sensing Systems and other manufacturers. Ono-sendai has announced a new sourceless orientation sensor (SensOS) which will be available soon based on magnetic and inclinometer technologies. The SensOS will be a low cost device, but will have limited angular range (+/−70 degrees) and will probably have update rates around 100 milliseconds.

Gyroscopes have been used for many years as an orientation device in navigation systems and projectile systems, such as ejection seats, rockets, and ballistic missiles. All of these systems except for the missiles use large mechanical gyros to sense and correct for changes in orientation. Mechanical gyros are not practical for virtual reality applications. However, Systron-Donner has developed a subminiature oscillating quartz gyro that is compatible with virtual reality applications.

SUMMARY OF THE INVENTION

An objective of the invention is to provide a system to quickly and accurately measure the orientation (azimuth, elevation, and roll) of a person's head. The orientation data can be used to present virtual audio over headphones, with unlimited angular range and displacement of the listener.

The invention relates to a position tracker which provides six degrees of freedom (DOF), pitch, roll and yaw, x, y, and z, for measuring angular orientation and linear translation of a human head. The apparatus according to the invention utilizes three types of sensors to provide the six D.O.F. to a virtual reality device. The Virtual Navigator combines three roll, pitch, and yaw gyroscopic sensors to provide relative angular displacement from an initial orientation. The gyro sensors use oscillating tuning forks for transduction of angular orientation information. Absolute orientation sensors include roll and pitch inclinometers which use the earth's gravitational field to compensate for the drift of the gyroscopic sensors; and a laser alignment or alternate sensor to compensate for the drift of the yaw gyro. These sensors provide an external reference frame to correct for drift in the relative angular measurement. The linear translation information is generated from accelerometers. The Virtual Navigator samples the analog data from the sensor suite and converts them into digital angular and linear coordinates.

The Virtual Navigator, according to the invention, is a position and orientation measurement system. It integrates angular rate information to provide angular displacement data along three axes: pitch, roll, and yaw. The Virtual Navigator is designed to be incorporated into virtual reality systems for research, simulation, measurement, and entertainment applications. The sensors can be attached to specific locations on the body or other objects and track their rotations. The features of this system include: (1) high accuracy, orientation angles measured within +/−0.05 degrees, (2) high speed, data provided up to 100 samples per second, (3) mobility, inertial data provided from the sensors without the need of a reference transmitter, and (4) portability, lightweight and easily attached. The system remains stable over long periods of time by periodically referencing absolute orientation devices. The subminiature, gyro based Virtual Navigator is a superior device for measuring angular displacements, either by itself or with other position, orientation, and virtual reality technologies.

The Virtual Navigator system may be used in at least three general areas. 1) virtual reality displays in operational systems, 2) tele-operation and robotics, and 3) training and simulation. The first area of use includes audio, visual, and tactile displays in aircraft, submarines, and armored personnel carriers. These environments typically have physical restrictions that cause the user to have poor situational awareness. Virtual reality technologies, which rely on orientation sensors to provide relative measurement of a human operator, can improve the users situational awareness and mission effectiveness. The second area includes any application which requires the orientation of a human or machine be remotely sensed and displayed back to a user at a control station. The third area includes the use of virtual reality technologies in flight simulators and other system simulators which require accurate information of the human operator and his/her environment to create a simulated environment as close to the actual environment as possible.

BRIEF DESCRIPTION OF THE DRAWING

FIG. 6b is the second half of the circuit diagram of FIG. 6a.

DETAILED DESCRIPTION

The initial application of the Virtual Navigator is to measure the orientation of a human head for the synthesis of virtual, directional audio over headphones. However, the system can be used for many other applications. Fast and accurate measurements of head orientation are critical for the creation of the illusion of virtual audio. The invention is an improvement on other slower, and less accurate trackers.

The concept of virtual audio is to encode naturally occurring spatial information on to an audio signal and present the sound source image over stereo headphones. The encoded audio signal is perceived to originate from a particular location in 3D space around the listener. Currently only directional simulations are accurate. Distance simulators do not accurately match actual listening environments. As the listener re-orients his/her head, the direction of the sound source is changed opposite to the head motion to make the sound appear stationary with respect to the surrounding environment. By using Digital Signal Processing (DSP) techniques the directional sound information is preserved. This is accomplished by head coupling, i.e. continually updating the sound field relative to the orientation of listener's head, to keep the sound source's direction stationary with respect to the listener. Applications of virtual audio synthesis could include the directional presentation of audio information for multiple communications, target location, threat warning, or navigation. Presenting audio information in a natural way, as localized sounds, may improve human performance in many spatially dependent working environments.

PROTOTYPE EMBODIMENT

Figure 1:
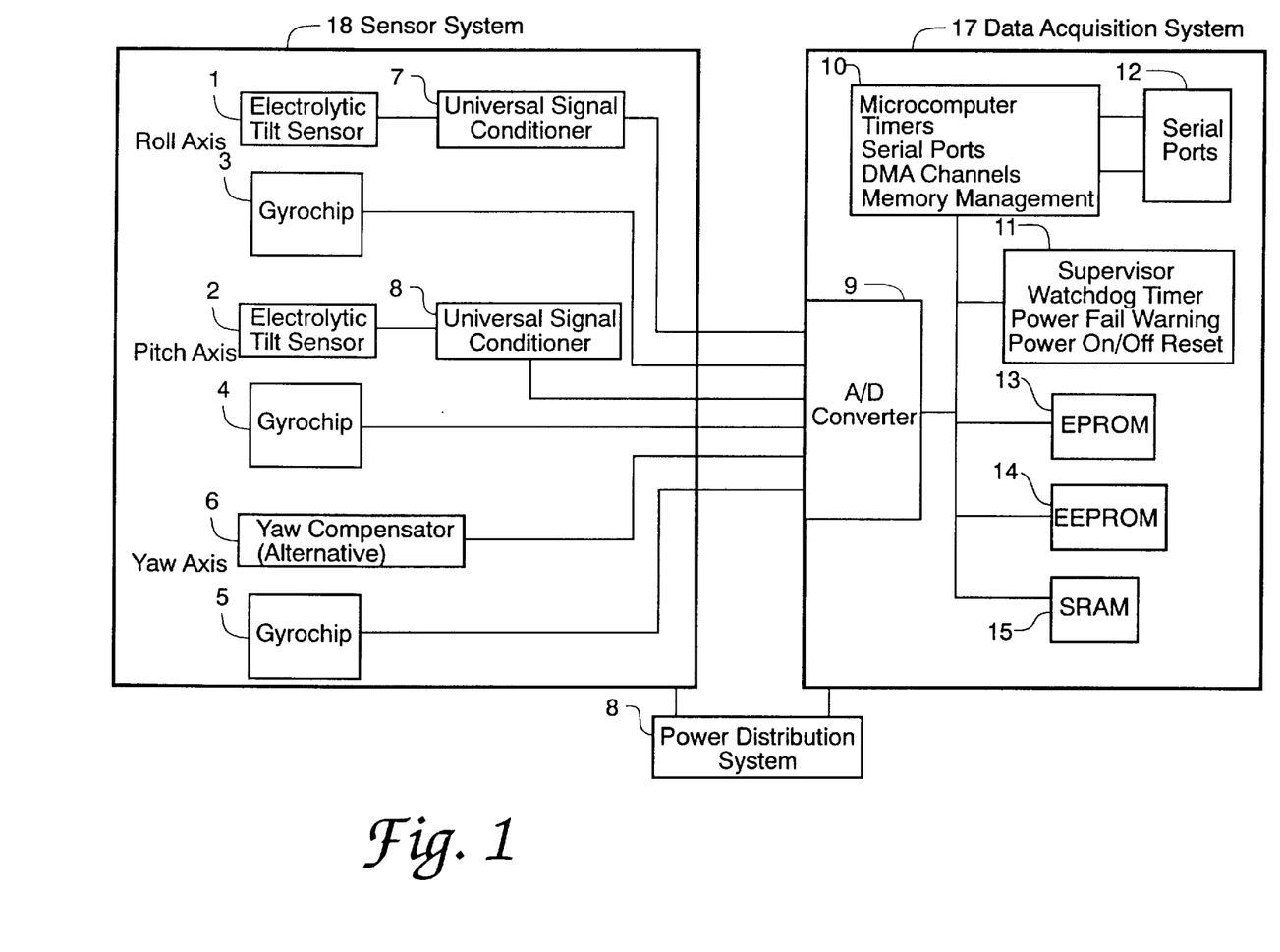
FIG. 1 is a block diagram of a prototype embodiment of the Virtual Navigator.

As shown in the block diagram of FIG. 1, the Virtual Navigator is comprised of two functional subsystems, the sensor system 18 and the data acquisition system 17. The sensor system 18 comprises three solid-state (Gyrochip) angular rate sensors 3, 4 and 5, two electrolytic tilt sensors 1 & 2, two universal signal conditioners 7 & 8, and an absolute yaw reference device 6.

Inertial angular rate is sensed by the Gyrochip which contains a subminiature oscillating quartz (tuning fork) element. The roll Gyrochip 3, pitch Gyrochip 4, and yaw Gyrochip 5, correspond to rotation around the X, Y, and Z axes of the Cartesian coordinate system, respectively. The Gyrochips provide a linear output voltage proportional to the angular velocity. However, the output from the Gyrochip will drift over time and accumulate an angular error at a rate of 0.01 degrees per second. To compensate for the drift, an absolute reference is established in roll and pitch using electrolytic tilt sensors 1 and 2, respectively.

The roll and pitch electrolytic tilt sensors 1 and 2 have a fixed center of gravity and are sensitive to changes in orientation with respect to the earth's gravity. They have a glass vial and electrodes which move relative to the sensor's center of gravity. Vertical sensing electrolytic potentiometers provide a linear output voltage as the units are tilted about the horizontal plane. The signal conditioners 7 and 8 are DC powered modules which provide AC power excitation to the tilt sensors, demodulate the electrolytic tilt sensor outputs, and amplify the resulting polarized (DC) signal. Thus, the universal signal conditioners 7 & 8 interface the tilt sensors with the data acquisition system 17. Other sensors are used to compensate for drift in yaw.

Three types of alternative sensors can be used for the yaw drift compensator 6. The alternatives include 1) a laser scanner, 2) a digital compass, and 3) an electro-magnetic tracker. The laser scanning system alternative is designed to transmit a plane of light, visible or infra-red, at a reference detector which triggers the data acquisition system when home is seen. The digital compass can be referenced any time yaw information relative to the earth's magnetic field is needed. Lastly, yaw data could be retrieved from commercially available electromagnetic trackers, such as from Polhemus Corporation or Ascension Technologies. The choice of a yaw compensation device would depend on the specific application of the Virtual Navigator. All outputs from the yaw compensator 6, universal signal conditioners 7 & 8, and the Gyrochips 3, 4, and 5 are connected to the data acquisition system 17 for processing into more meaningful form for a host computer to interpret.

The data acquisition system 17 converts the analog signals from the sensor system into digital, angular orientation data. The data acquisition system comprises an A/D converter 9, a microcomputer 10, a supervisor circuit 11, serial ports 12, and data memory comprising modules 13, 14 & 15. The microcomputer has the following features. Programmable counter timers are used as baud rate generators for the serial ports, periodic interrupts for the real-time Kernel, and control of the sampling rate of the A/D converter 9. Serial ports are programmable and interrupt driven. Direct memory access ports and memory management provide addressing up to one megabyte in the data acquisition system.

There are three memory components with which the microcomputer communicates. These are the erasable programmable read only memory (EPROM) 13, electronically erasable read only memory (EEPROM) 14, and static random access memory (SRAM) 15. The 256K bytes of EPROM 13 contain the Kernal and the applications program. The 512K bytes of EEPROM is used to hold the baud rate and other semi-permanent calibration and setup constants. The 512K bytes of battery backed SRAM 15 are used to store variable mailboxes and data tables. The analog-to-digital converter 9 comprises eight channels of 12-bit A/D's. Each channel is amplified with a precision operational amplifier. Six of the eight channels are used for the three Gyrochips, two electrolytic tilt sensors, and yaw compensator inputs. The serial ports 12 are full-duplexed asynchronous channels which communicate with the host and development computers. The Supervisor 11 contains a watchdog timer, power up/on reset circuitry and power fail detector. The watchdog timer resets the microprocessor if a fault condition causes the microprocessor to enter into an illegal state. The power on/off circuitry assures a stable power transition between integrated circuits. The power fail detector monitors input voltage to the controller and detects levels below the acceptable threshold. A non-maskable interrupt takes place which enables the power-fail routine to perform a shutdown procedure prior to power failure.

The power distribution system 16 provides power to the controller, Gyrochip inertial rate sensors, and electrolytic sensors. The controller and Gyrochips require +5 V and −5 V. The universal signal conditioners require +15 V and −15 v. The yaw compensators have independent power supplies.

Software

Figure 2:
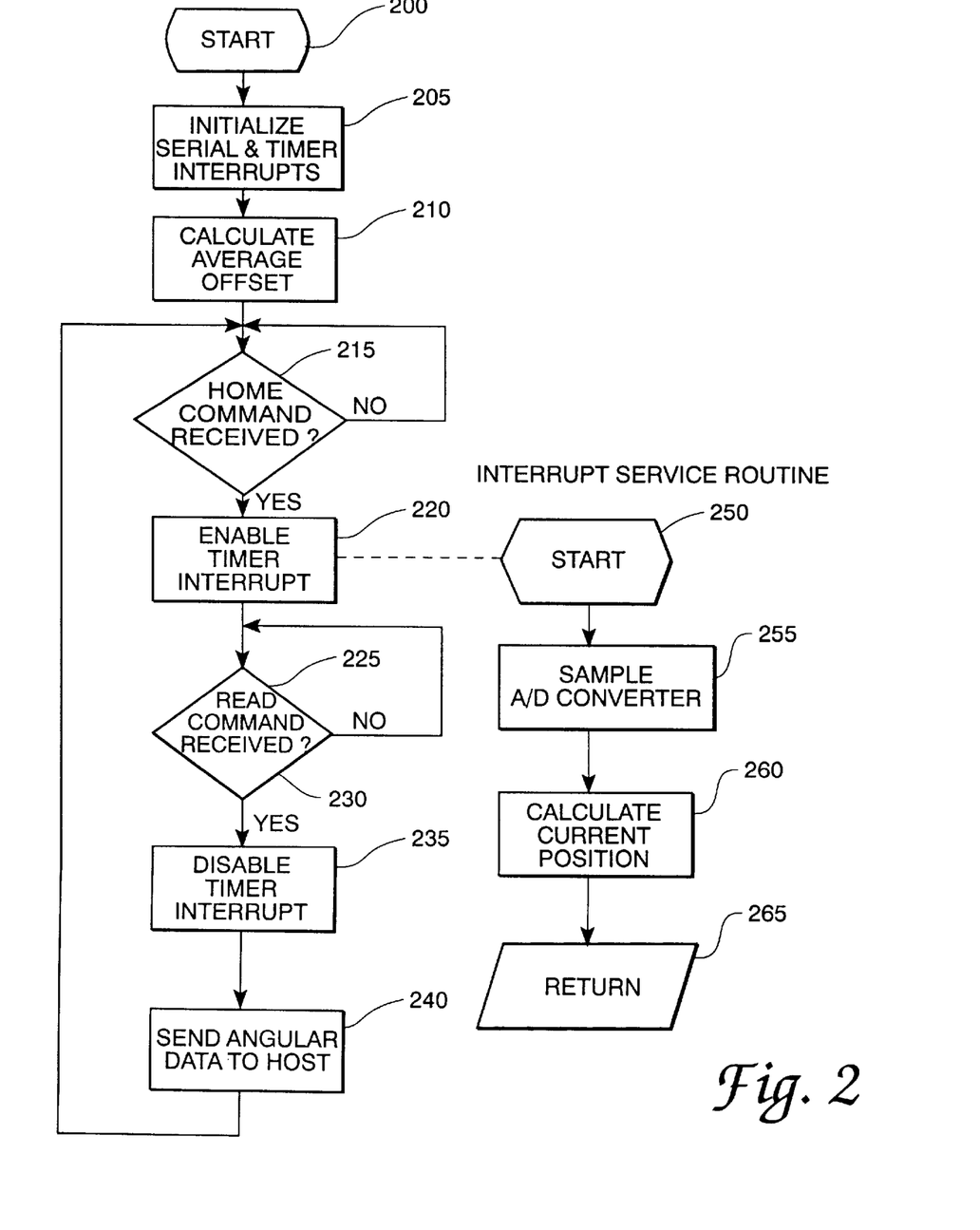
FIG. 2 is a flow chart of the application software for the Virtual Navigator embodiment of FIG. 1.

The application software for the Virtual Navigator is shown in the flowchart of FIG. 2. The software routine is used to validate the performance of the system. When configured as a head tracker, the software will be written to continuously measure angles without resetting the microprocessor between integration periods. The following description is for a single measurement.

Operation starts at block 200 and goes to block 205. First, the serial port which communicates with the host computer is initialized. The interrupt priority level is set, the interrupt service routine has higher priority than the serial port in order to keep accurate record of the integration period. At block 210, an average offset is calculated. The main program waits at block 215 until a "Home" command is issued by the host computer. Once received, the software goes to block 220 to enable the timer interrupt to periodically call the interrupt service routine, which starts at block 250. Next, the main program waits at block 225 for the "Read" command to be issued by the host computer. Then at block 235 the timer interrupt is disabled, and at block 240 the angular velocity and displacement is sent in a serial format to the host computer.

The interrupt service routine which starts at block 250, at block 255 samples the six channels of the A/D converter, which includes the inertial angles and absolute reference angles. At block 260, the angular displacement around each axis is calculated by integrating the angular velocity over the sampling period. The current angular position is continually updated by correcting for drift using the values from the absolute references in pitch, roll, and yaw. At block 265, the interrupt program has a return to wait for the next interrupt.

CURRENT EMBODIMENT

Figure 3:
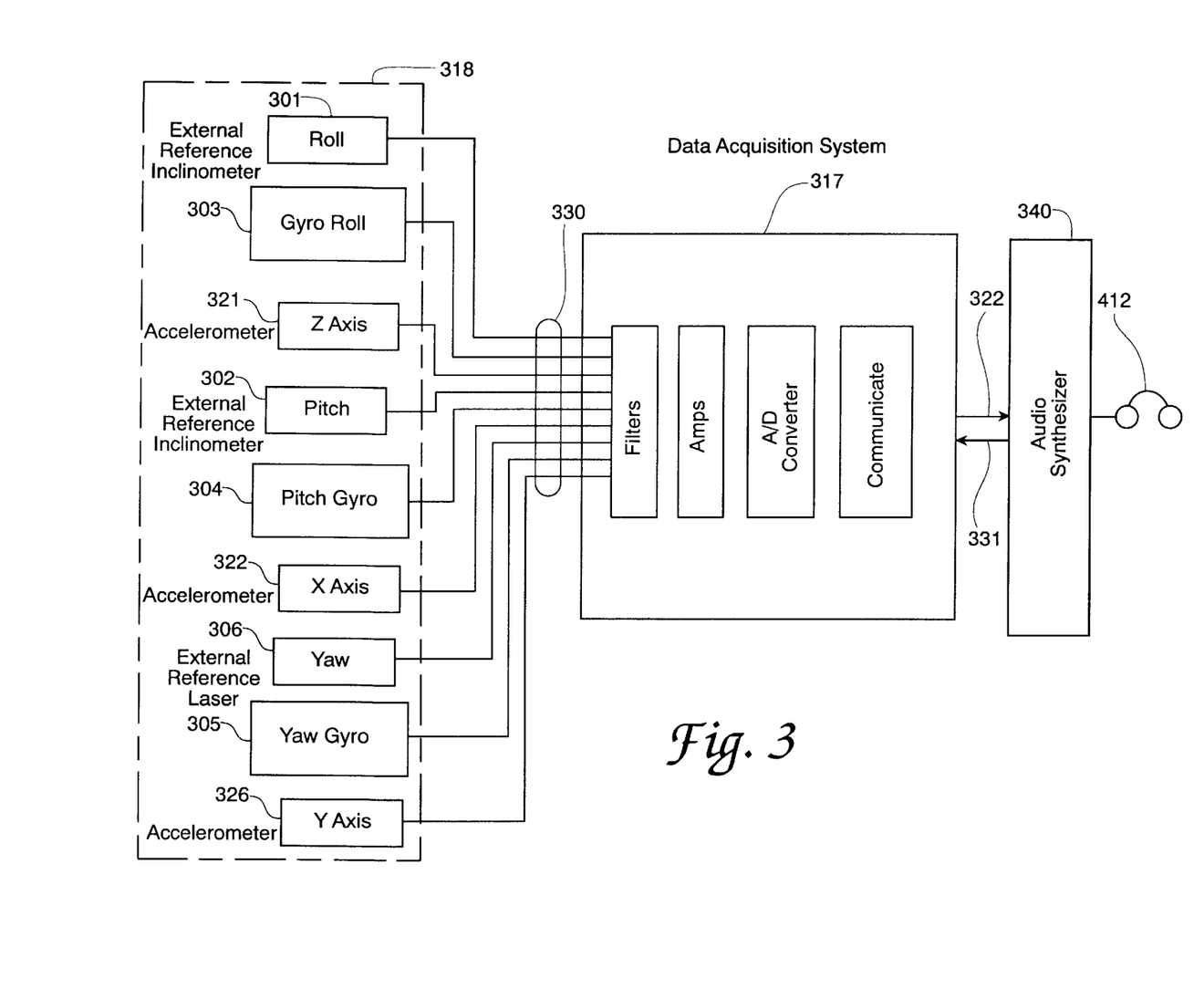
FIG. 3 is a block diagram of a current embodiment of the Virtual Navigator.

The Virtual Navigator has been enhanced with new electronic hardware and software. The latest design is shown in FIG. 3. The Virtual navigator has the ability to sample at high speeds and communicate at greater data rates with the audio synthesizer 340.

The hardware comprises two subsystems, a sensor package 318 and a data acquisition system 317. The sensors in unit 318 comprise three sets of angular sensors, corresponding to those shown in FIG. 1. Each set includes a gyroscopic rate sensor from Systron Donner, an accelerometer from AMP, and an external reference which is either an inclinometer or laser (yaw). The set for roll comprises an inclinometer 301, a gyro 303, and a z-axis accelerometer 321. The set for pitch comprises an inclinometer 302, a gyro 304, and a x-axis accelerometer 322. The set for yaw comprises an external reference laser 306, a gyro 305, and a y-axis accelerometer 326.

The data acquisition system 317 comprises filters and amplifiers for each channel. The A/D converter samples all of the channels and converts the data into a serial bit stream 322 which is sent to the audio synthesizer 340. Output from the audio synthesizer 340 goes to a set of stereo headphones 412.

The audio synthesizer includes a digital signal processor (host computer), which supplies control signals to the data acquisition system 317. A computer code listing of five pages is included herein before the claims.

Figure 4:
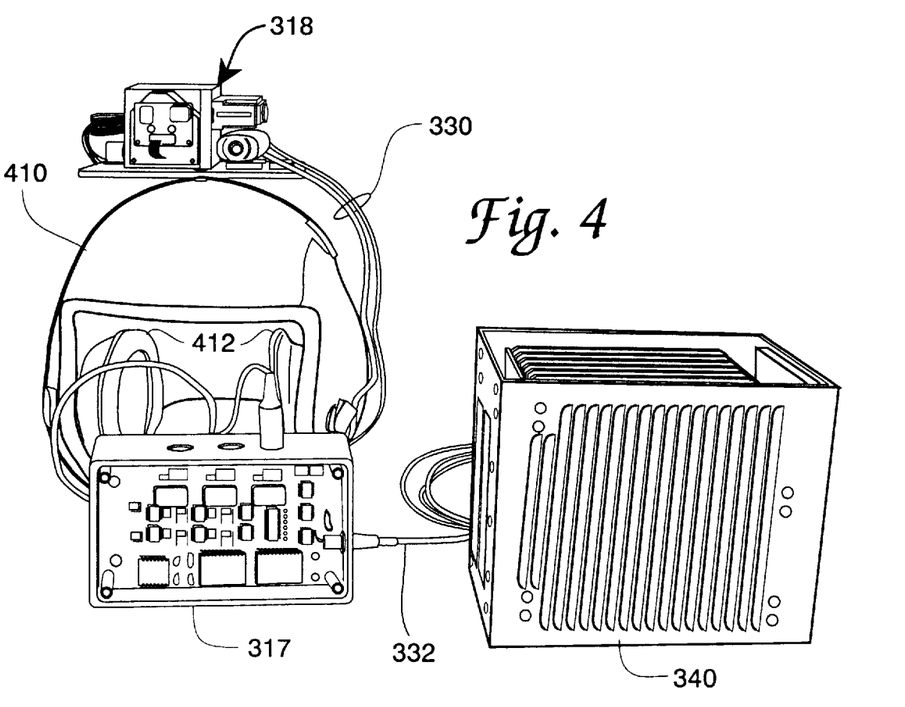
FIG. 4 is a pictorial diagram made from a photograph of the embodiment of FIG. 3.
Figure 5:
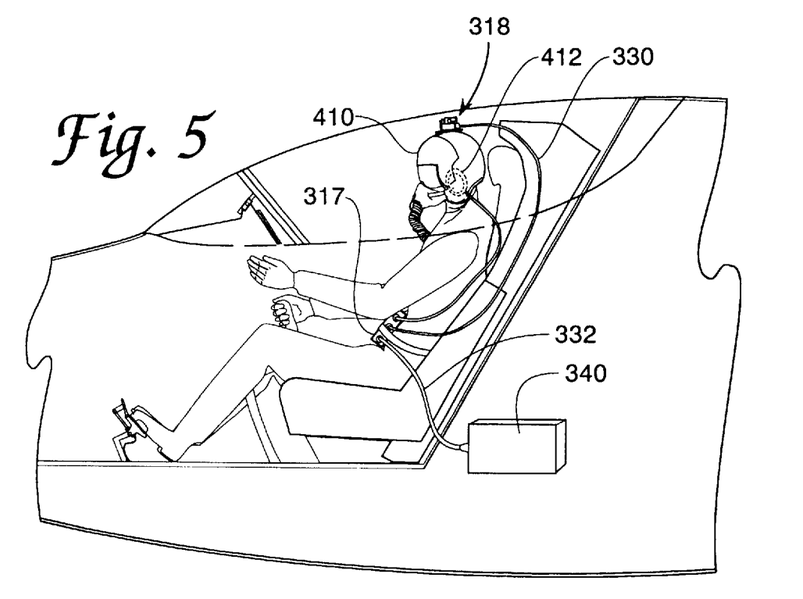
FIG. 5 is a pictorial diagram of the embodiment of FIG. 3 in use in an aircraft cockpit.

FIG. 4 is a pictorial diagram made from a photograph, and FIG. 5 is a pictorial diagram showing use in an aircraft cockpit, of the apparatus of FIG. 3. The sensor unit 318 is mounted on top of a helmet 410. The sensor unit 318 is connected via cables 330 to the data acquisition unit 317, which in turn is connected via a cable 332 to the audio synthesizer 340. Output from the audio synthesizer is connected to headphones 412 inside of the helmet 420.

Figure 6A:
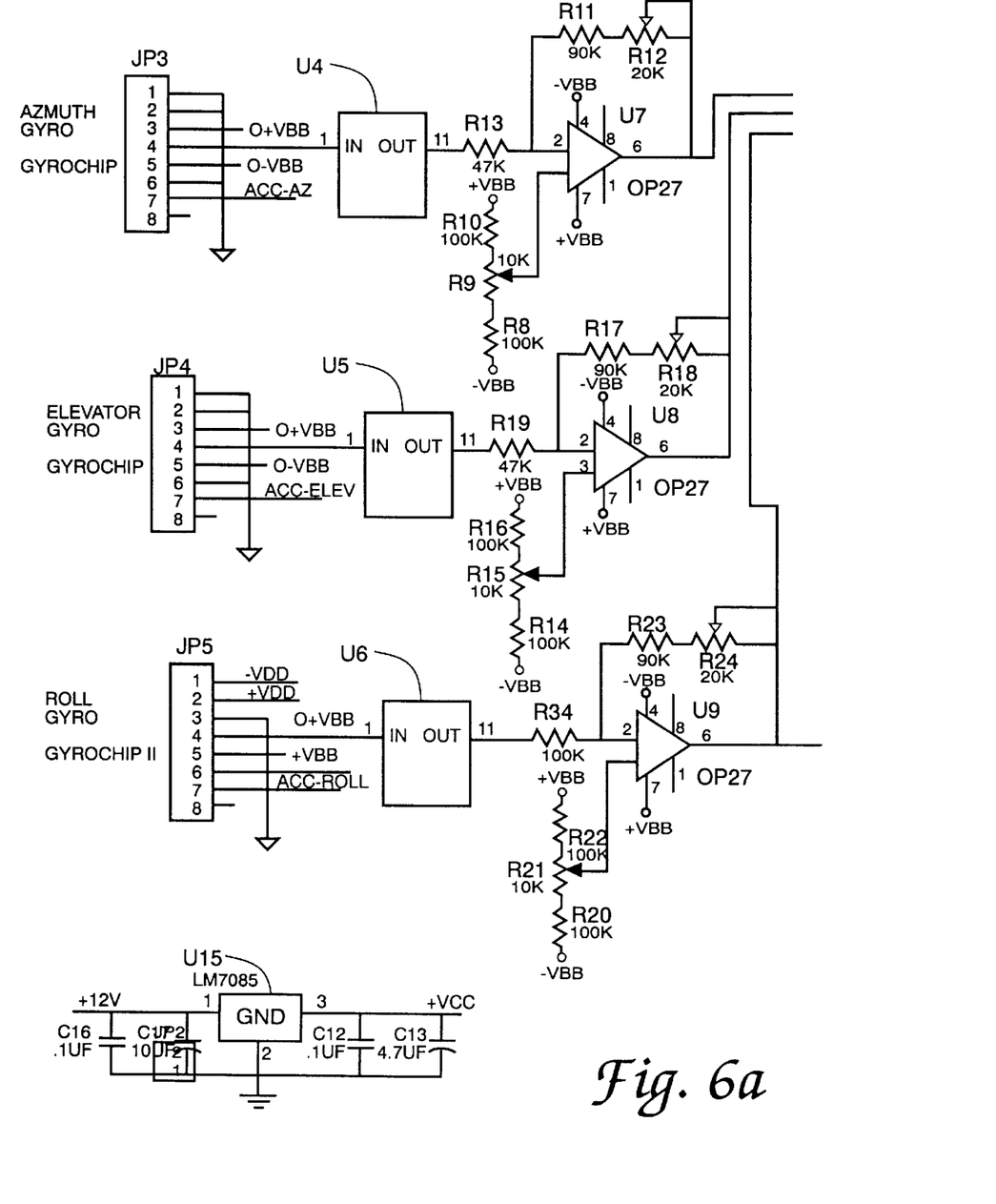
FIG. 6a is half of a circuit diagram of the data acquisition system for the embodiment of FIG. 3.
Figure 6B:
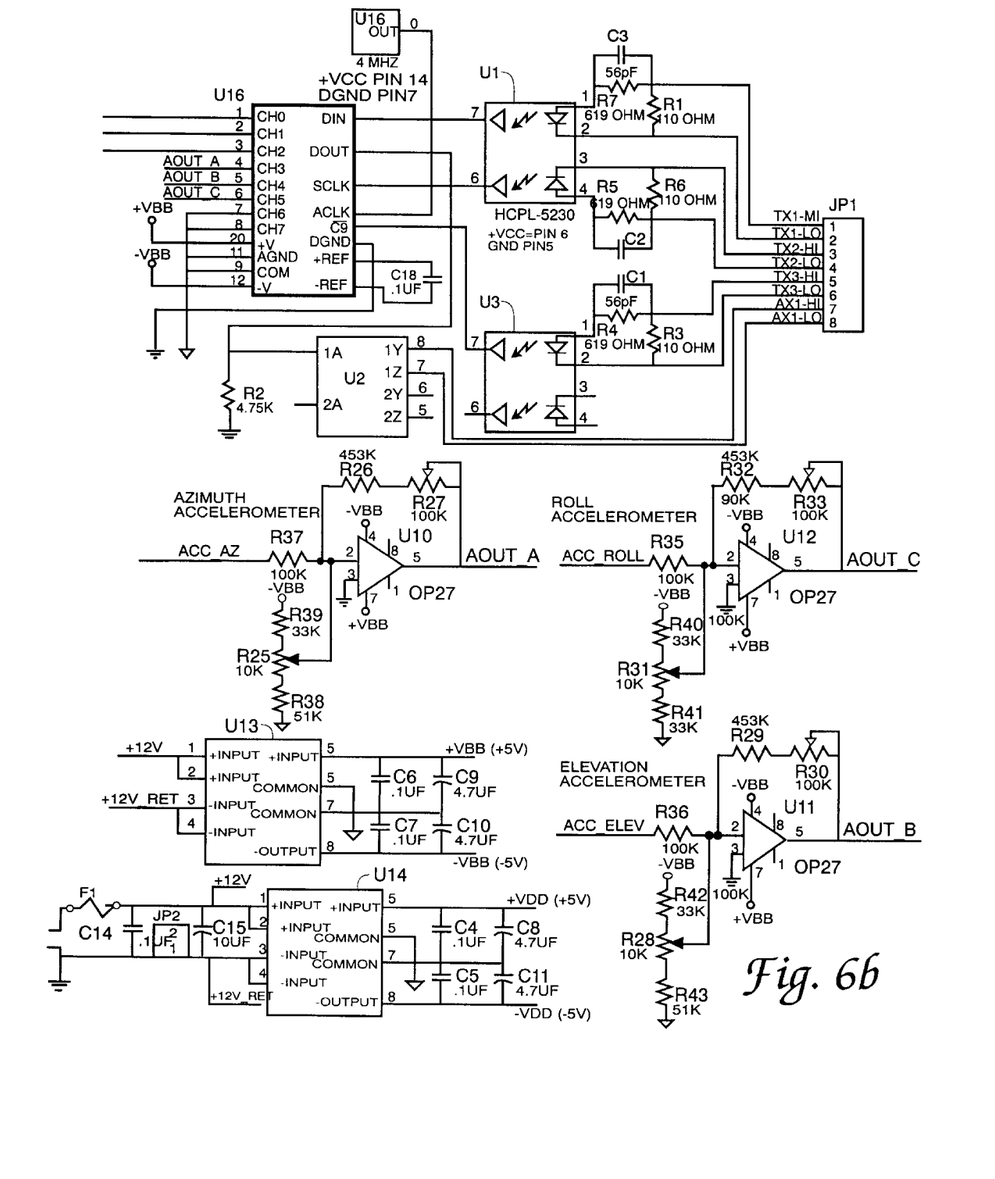

FIGS. 6a and 6b are the first and second halves, respectively, of a circuit diagram of the data acquisition for the embodiment of FIG. 3. FIGS. 6a and 6b may be aligned to view a complete circuit diagram.

The parts list for FIG. 6 is shown in the following table:

| ## | Qty | Reference | Part | Description | Manufacturer |
|---|---|---|---|---|---|
| 1 | 3 | C1,C2,C3 | CK12BX560K | 56 pF CAP | KEMET |
| 2 | 8 | C4,C5,C6, C7,C12,C14, C16,C18 | CX05BX104K | 0.1 $\mu$F CAP | KEMET |
| 3 | 5 | C8,C9,C10, C11,C13 | T350G475K035AS | 4.7 $\mu$F TANT. CAP | KEMET |
| 4 | 2 | C15,C17 | T350G106K035AS | 10 $\mu$F CAP | KEMET |
| 5 | 1 | F1 | 251001 | 1A FUSE | LITTLEFUSE |
| 6 | 4 | JP1,JP3,JP4,JP5 | MD-80SM | 8 PIN CONN. | CSTACK |
| 7 | 1 | JP2 | 22-12-2024 | 2 PIN CONN. | MOLEX |
| 8 | 3 | R1,R3,R6 | RN55D110F | 110 OHM | DALE |
| 9 | 1 | R2 | RN55DF4751F | 4.75K | DALE |
| 10 | 3 | R4,R5,R7 | RN55D6190F | 619 OHM | DALE |
| 11 | 6 | R10,R16,R22 R37,R36,R35 | RN55D1003F | 100K | DALE |
| 12 | 6 | R9,R15,R21, R28,R31,R25 | RJ26FW103F | 10K POT | BOURNS |
| 13 | 3 | R26,R32,R29 | RN155D4533F | 453K | DALE |
| 14 | 6 | R11,R17,R23, R28,R33,R38 | RN55D9002F | 90K | DALE |
| 15 | 3 | R27,R30,R33, | RJ26FW104F | 100K POT | BOURNS |
| 16 | 2 | R13,R19 | RN55D4702F | 47K | DALE |
| 17 | 3 | R43,R41,R38 | RN55D5102F | 51K | DALE |
| 18 | 3 | R39,R42,R40 | RN55D3302F | 33K | DALE |
| 19 | 2 | U1,U3 | HCPL-4230 | OPTO-ISOLATOR | HP |
| 20 | 3 | R12,R18,R24 | RJ26FW203F | 20K POT | BOURNES |
| 21 | 1 | U2 | DS9638MJ | RS232/422 | NATIONAL |
| 22 | 3 | U4,U5,U6 | 8088 | FILTER-BUFFER | FREQUENCY DEVICES |
| 23 | 6 | U7,U8,U9, U10,U11,U12 | OP27 | OP AMP | BURR BROWN |
| 24 | 1 | U13 | BWR-5/250-D12 | DC-DC | DATEL |
| 25 | 1 | U14 | BWR-15/100-D12 | DC-DC | DATEL |
| 26 | 1 | U15 | LM7805 | =5V REGULATOR | NATIONAL |
| 27 | 1 | U16 | LTC1290 | A/D CONVERTER | LINEAR TECH. |
| 28 | 1 | U17 | 4 HMZ | OSCILLATOR | |

Advantages and New Features

The main advantage of the invention is its very high speed and accuracy without the need of a device which continuously transmits a reference location to the sensors. The combination of these features make it a unique device ideally suited for virtual reality and other applications. The Presence article by Meyer, Applewhite, and Biocca includes a thorough comparison of existing position trackers. Trackers were evaluated in five categories: 1) resolution and accuracy, 2) responsiveness, 3) robustness, 4) registration, and 5) sociability. The article states that the electro-magnetic trackers from Polhemus and Ascension Technologies are among the popular systems. However, the robustness of these systems is low due to susceptibility to magnetic interference and the difficulty of accurately referencing (boresighting) the system. The Virtual Navigator is immune to magnetic interference and is probably the most robust system. The Virtual Navigator is equal to or better than other trackers in all of these categories.

A new feature of the invention is the correction for drift by a combination of technologies. The gyroscopes provide the relative, inertial angular data with high speed and accuracy, but tend to accumulate errors due to drift. The inclinometers in pitch and roll provide slow, accurate data that remain stable over time. Similarly, the yaw compensator devices, (optical scanner, digital compass, magnetometer, and electro-magnetic trackers) provide slow accurate azimuthal data. By combining the high speed gyros with the slow but stable compensation devices, a product is realized that is fast, accurate, and stable over time.

Alternatives

The invention can be used anywhere that the orientation of an object is needed. In addition to virtual audio applications, head orientation data could also be used for virtual vision and the combination of audio and vision. Another virtual reality application would include monitoring the orientation of various parts of the human body. Teleoperation and human sensory feedback are related technology areas.

The invention can be integrated with other technologies, such as found in navigation for automotive, geotechnical, medical, aerospace, mining, agriculture, sports training, surveying, and other industries. By combining the orientation device to a global positioning system (GPS) receiver, a versatile navigation tool could be created. The automotive industry could use the invention for navigation and active suspension applications. The high accuracy and portability features make it usable in surveying applications for measuring grades and angles. It could be especially useful when an optical surveying system has an obstructed line-of-sight.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

---

GYROPROC - Control Module for Gyro System
Adapted from CFBAPROC - 12/22/94
Copyright (c) 1994 System Research Laboratories (SRL)

```
#include "\av8b\ioports.h"
#include "gyroport.h"
/*Function Identifiers for Commands*/
#define SYSRES 'R'              /*SYStem RESet*I
#define HOME 'H'                /*HOME initialization*/
#define DOWNLD 'D'              /*Download and program*/
/*Global Variables*/
int *DRR=(int*) 0;              /*serial port Data Receive Reg*/
int *DXR=(int*) 1;              /*serial port Data Transmit Reg*/
int *TIM=(int*) 2;              /*TIMer reg*/
int *PRD=(int*) 3;              /*PeRiOD reg*/
int *IMR=(int*) 4;              /*Interrupt Mask Reg*/
int *GREG=(int*) 5;             /*Global memory allocation REG*/
int MAX_CNT = 10000;            /*offset calculation sample set size*/
/*Global Variables*/
extern int rxibuf 2[];          /*Transmit and Receive Buffers*/
extern int txbuf[];
extern int *htwrk,htbufflip;
extern long CHNDAT[],snapshot[];
extern float off set[],scale[],period;
extern int CUE_CNT,CUE_EVENT,CUE_RESET,CUE_RESET_DEF;
/*Event counter*/
extern int ICHN,OFFSETS;
extern int sperr2;              /*SP Error Flag*/
extern int spdone2;             /*RX Done Flag*/
extern int spmode2;
void main() {
int i,tempvar;
DUARTIN2();                     /*Initialize DUART 2*/
gyrosysini();                   /*Initialize Control panel*/
asm("      EINT");
while (!CUE_EVENT); /*Wait for offset summation*/
for (i=0 ; 1<3 ; offset[i++] = ((float)snapshot[i])/((float)(MAX_CNT)));
CUE EVENT = 0;
OFFSETS = 0;
CUE_RESET_DEF = 145;            /*update rate is 100Hz*/
while (1) {                     /*Infinite Loop*/
if (CUE_EVENT >0){
for (i=0 ; i<3 ; i++) {
tempvar = snapshot[i]*scale[i]*period;
if (tempvar>180) *(htwrk+i) = tempvar-360;
else if (tempvar>180) *(htwrk+i) =tempvar+180;
}
CUE_EVENT = 0;
while (htbufflip == 1);         /*wait for alternate buffer ready*/
htbuffiip = 1;
}
else if (CUE_EVENT<0) *htwrk = -32768; /*gyro system error*/
if (spdone2 >0) {               /* process command */
txbuf[0]=3;
txbuf[1]=6;                     /*setup for ACK response*/
switch (rxibuf2[1]) {
case SYSRES:
asm("      B 0")
break;
case HOME:
asm(" DINT")
for (i=0 ; i<3 ; CHNDAT[i++] = 0);
CUE_EVENT = 0;
CUE_RESET = CUE RESET_DEF;
CUE_CNT = CUE_RESET_DEF;
asm(" EINT");
break;
case DOWNLD:                    /* Program Download*/
if (rxibuf2[2] =='I') {
line_params(CRA2, (long)38400);
IOPRLD2(2);
}
else {
txbuf[0]= 3;
txbuf[1]= 21;
}
break;
default:
txbuf[0]=3;
txbuf[1]=21;
break;
}
sptx2 ();
asm (" DINT");
if (spdone2 > 0) spdone2=0;
asm (" EINT");
}
```

```
if (sperr2) {                    /* serial port error */
sperr2=0;
txbuf[0]=3;
txbuf[1]=21;
sptx2();
    }
  }
}
```

GYROSYS.C - ADG based Gyro System
Adapted from ADG Control Panel Handler - 12/21/94
Copyright (c) 1994 Systems Research Laboratories (SRL)

```
#include "gyroport.h"
#include "\av8b\ioports.h"
long CHNDAT[3],snapshot[3];
int HTBUF0[3]={0,0,0},HTBUF1[3],htbufflip=0;
int ICHN=-1,htbytecnt = 1,*htptr=HTBUF0,*htwrk=HTBUF1;
int channelsel[3]={0x0E780, 0x0CF80, 0x0C780};
float offset[3];
float scale[3];
float period,sample_rate=14.5;
int CUE_CNT,CUE_RESET,CUE_RESET_DEF,CUE_EVENT,
OFFSETS=1;
extern int *DRR;                 /*Data Receive Reg*/
extern int *DXR;                 /*Data Transmit Reg*/
extern int *TIM;                 /*TIMer reg*/
extern int *PRD;                 /*PeRioD reg*/
extern int *IMR;                 /*Interrupt Mask Reg*/
/*Serial Port Receive Initialization*/
gyrosysini() {
int dummy;
asm(" FORT 0");                  /*16 Bit Format*/
asm(" STXM");                    /*Internal TX Synch*/
asm(" SFSM");                    /*Frame Synch Mode (EXT RX)*/
outport(CP_RS,dummy);            /*Reset CP interrupt (RINT)*/
ICHN = -1; /*Initialize Channel for 1 garbage word*/
CUE_CNT = 10001; /*offset calculation counter
(+1 for garbage)*/
OFFSETS = 1; /*offsets calculation flag*/
for (dummy=0 ; dummy<3 ; dummy++) {
    CHNDAT[dummy] = 0;
    snapshot[dummy] = 0;
    offset[dummy] = 0;
    scale[dummy] = 1000./2048.;
}
scale[0] = 1000./2048.;
scale[1] = 1000./2048.;
scale[2] = 1000./2048.;
sample_rate = 14.5;
period = 1./sample_rate;
*TIM = *PRD = 230; /*Set TIMer for 23uS interval*/
*PI_WRITE = 0x0f; /*seed the Parallel Port*/
*IMR |= 0x0a; /*Enable SP Rx interrupt (TINT)
/* and Parallel Port (INT2)*/
}
c_int4() { /*Gyro A/D (TINT) ISR */
int dummy,*cp;
outport(CP_CS,dummy); /*Channel Select*/
if (ICHN >= 0) *DXR=channelsel[ICHN]; /*Output channel code*/
else *DXR=channelsel[2];
asm(" RPTK 108");                /*keep data transfer protected!*/
asm(" NOP");
outport (CP_RS,dummy);           /*Reset Interrupt*/
if (ICHN >= 0) {
if (CUE_CNT) {
if (!OFFSETS) {                  /*normal operation*/
dummy = (((*DRR)>>4) - offset[ICHN]);
if (dummy<-5 || dummy>5) /*check for noise*/
CHNDAT[ICHN] += dummy;
else CHNDAT[ICHN] += ((*DRR)>>4); /*summation for offset*/
}
else dummy = *DRR;               /*Gyro System idle*/
}
else dummy = *DRR;               /*Initial garbage read*/
ICHN=(ICHN+1)%3;
if (!ICHN) {
if (CUE_CNT)
if (!(--CUE_CNT)) {
CUE_CNT = CUE_RESET;             /*event counter*/
```

```
if (!CUE_EVENT) {
snapshot[0] = CHNDAT[0];
snapshot[1] = CHNDAT[1];
snapshot[2] = CHNDAT[2];
CUE_EVENT = 1;
    }
else CUE_EVENT = -1;
    }
  }
}
c_int3() {                       /*Parallel Port (INT2) ISR*/
switch (htbytecnt) {
case 0:
*PI_WRITE = (*htptr<<4)|0x0f;
break;
case 1:
case 3:
case 5:
*PI_WRITE = *(htptr + htbytecnt)>>8;
if (htbufflip) {
if (htptr == HTBUF0) {
htptr = HTBUF1;
htwrk = HTBUF0;
}
else {
htptr = HTBUF1;
htwrk = HTBUF0;
}
htbufflip = 0;
}
break;
case 2:
case 4:
*PI_WRITE = (*(htptr +htbytecnt))<<4;
break;
}
htbytecnt = (htbytecnt+1)%6;
*PI_RESET = 1;                   /*reset interrupt*/
}
```

What is claimed is:

1. An audio system apparatus providing audio signals to a human operator, said audio signals perceived to originate from a particular fixed location in 3-dimensional aircraft enclosed space around the human operator and updated upon movement of said human operator comprising:

operator head to aircraft sensing means including a first solid state gyrochip angular rate sensor for sensing, with respect to said aircraft, head roll angular rate, a second solid state gyrochip angular rate sensor for sensing head pitch angular rate and a third solid state gyrochip angular rate sensor for sensing head azimuth angular rate, said first, second and third solid state gyrochips each containing a tuning fork element for transducing head angular rate information and providing inertial linear output voltage proportional to angular velocity, and first, second and third accelerometers for sensing, respectively, x, y and z coordinate system linear rate and providing linear output voltage proportional thereto;

compensation means connected to said operator head to aircraft sensing means to correct aircraft to head angular error of said sensing means including a first and second electrolytic tilt sensor for correcting error of said first and second solid state gyrochip angular rate sensors, respectively, and an emitter scanner azimuth compensator for correcting error of said third solid state gyrochip angular rate sensor, said emitter scanner system including:

means for transmitting a plane of light at a reference detector, and means for notifying said audio synthesizer of angular position error wherein said compensation means provides absolute external reference frame to correct for drift in relative angular rate measurements;

signal conditioners connected to said compensation means for providing AC power to said compensation means, and demodulating and amplifying output therefrom;

analog-to-digital converter means connected to said sensing means for converting analog linear output voltage signals therefrom into digital rate signals;

audio synthesizer means connected to said analog-to-digital converter means for integrating said digital rate signals into digital position signals and for encoding said digital position signals into an audio signal, said audio signal continually updated relative to the orientation of said human operator head to keep said audio signal stationary relative to said human operator; and means for providing said audio signal stereophonically to said human operator.

2. The audio system apparatus as in claim 1, wherein said plane of light is visible light.

3. The audio system apparatus as in claim 1, wherein said plane of light is infra-red light.

4. An audio system apparatus as in claim 1, said audio synthesizer means further including a microprocessor, said microprocessor comprising:

a serial input port;

an interrupt service routine;

means for initializing said serial port including setting an interrupt priority level and providing said interrupt service routine with higher priority than said serial port;

means for calculating an average offset connected to said means for initializing;

means for selectively enabling a time interrupt to call said interrupt service routine connected to said means for calculating;

means for providing angular velocity and displacement in a serial format connected to said means for selectively enabling;

means for sampling analog-to-digital converter output channels of said analog-to-digital converter means including inertial angles and absolute reference angles connected to said means for providing; and means for calculating angular position around each axis by integrating said angular velocity over a sampling period connected to said means for sampling, said means for calculating angular position further including means for updating said angular position by correcting error using values from said absolute reference angles.

5. The audio system apparatus as in claim 4, wherein said microprocessor further includes memory managing electronically erasable programmable read only memory (EEPROM), electronically erasable read only memory (EPROM) and static random access memory (SRAM).

6. An audio system apparatus providing audio signals to a human operator, said audio signals perceived to originate from a particular fixed location around the human operator and updated upon movement of said human operator in a virtual reality environment comprising:

operator head to aircraft sensing means including a first solid state gyrochip angular rate sensor for sensing head roll angular rate, a second solid-state gyrochip angular rate sensor for sensing head pitch angular rate and a third solid state gyrochip angular rate sensor for sensing head azimuth angular rate; said first, second and third solid-state gyrochips receiving power from two aircraft connected 12 V direct current converters and providing linear output voltage proportional to angular velocity, and first, second and third accelerometers for sensing, respectively, x, y and z coordinate system linear rate and providing linear output voltage proportional thereto;

first, second and third connectors connected to outputs of said first second and third solid-state gyrochip angular rate sensors;

a plurality of analog filters connected to said first second and third connectors for receiving and filtering noise from outputs of said first, second and third solid-state gyrochip angular rate sensors;

operational amplifiers connected to said first, second and third analog filters and said first, second and third accelerometers, respectively, for receiving and amplifying outputs therefrom;

8-channel analog-to-digital converter means for converting analog outputs from said operational amplifiers into digital form, said 8-channel analog-to-digital converter means including a data selector and a 4 MHZ clock for controlling rate of sampling outputs from said operational amplifiers;

a plurality of optical couplers connected to said 8-channel analog-to-digital converter means for receiving control signals from said 8-channel analog-to-digital converter means;

a fourth connector connected to said optical couplers;

audio synthesizer means connected to said fourth connector for integrating digital output of said 8-channel analog-to-digital converter means into digital position data and encoding said angular position data into an audio signal; and means for providing said audio signal to said human operator wherein said audio signal is perceived to originate from a particular location in 3D space around the listener, said audio signal updated upon movement of said human operator.

* * * * *